March 24, 1931.  E. J. OHNELL  1,797,441
MEASURING INSTRUMENT
Filed June 24, 1927  5 Sheets-Sheet 1
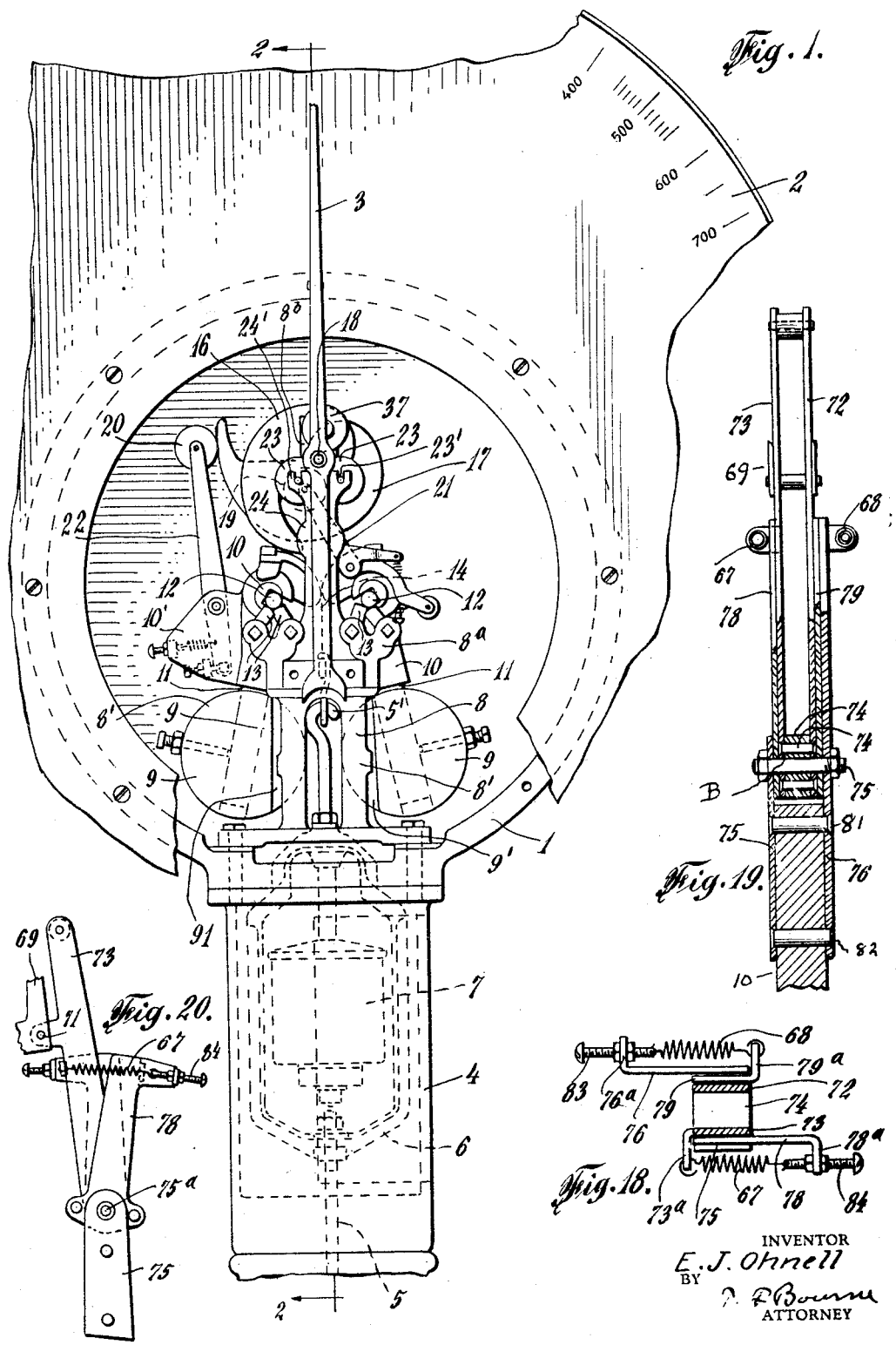
INVENTOR
E. J. Ohnell
BY
P. Bourne
ATTORNEY March 24, 1931. E. J. OHNELL 1,797,441
MEASURING INSTRUMENT
Filed June 24, 1927 5 Sheets-Sheet 2
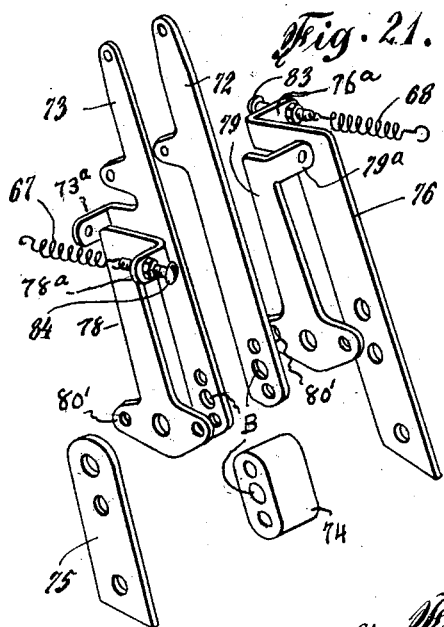
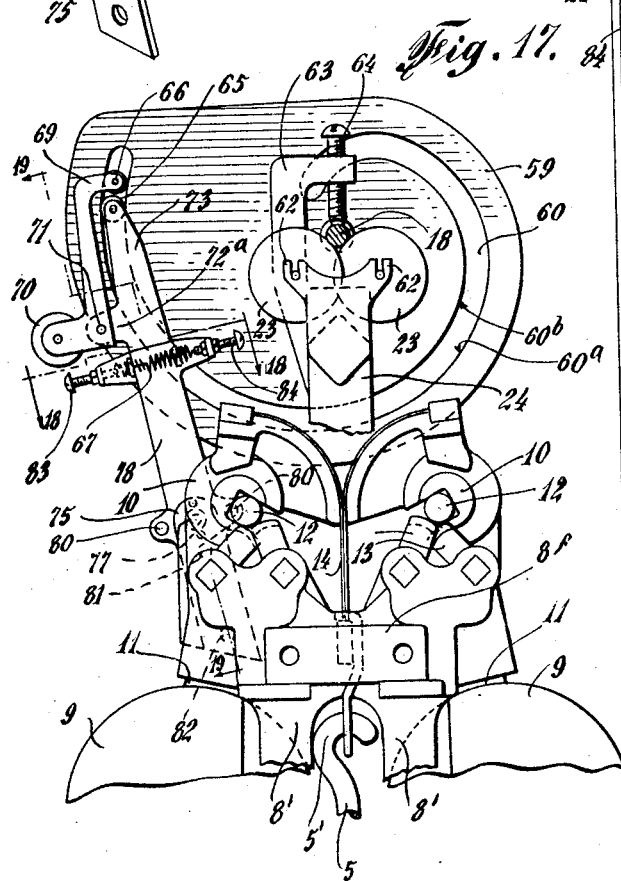
INVENTOR
E. J. Ohnell
BY T. F. Bourne
ATTORNEY March 24, 1931.    E. J. OHNELL    1,797,441
MEASURING INSTRUMENT
Filed June 24, 1927    5 Sheets-Sheet 3
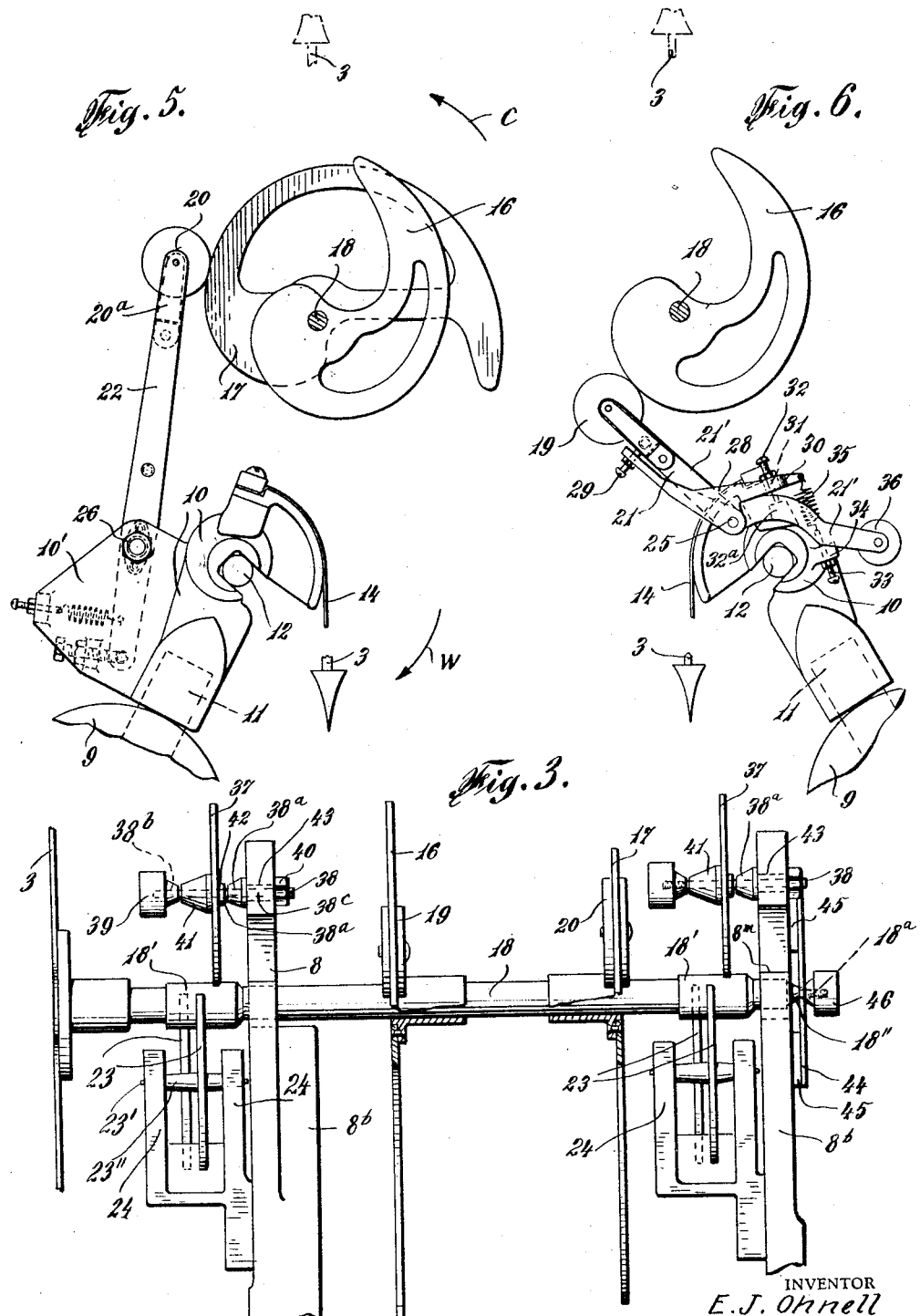
INVENTOR
E. J. Ohnell
BY
T. F. Bourne
ATTORNEY

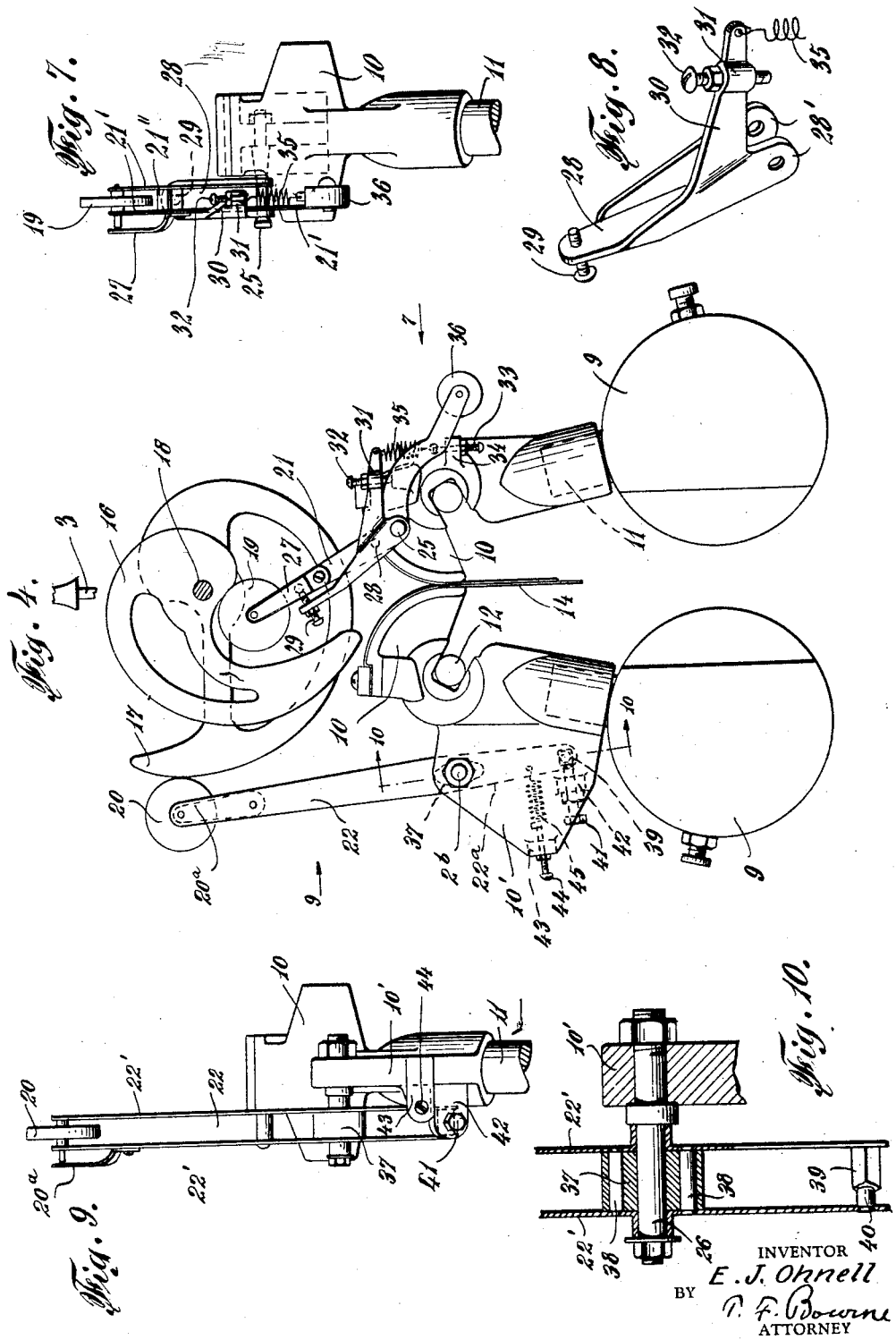

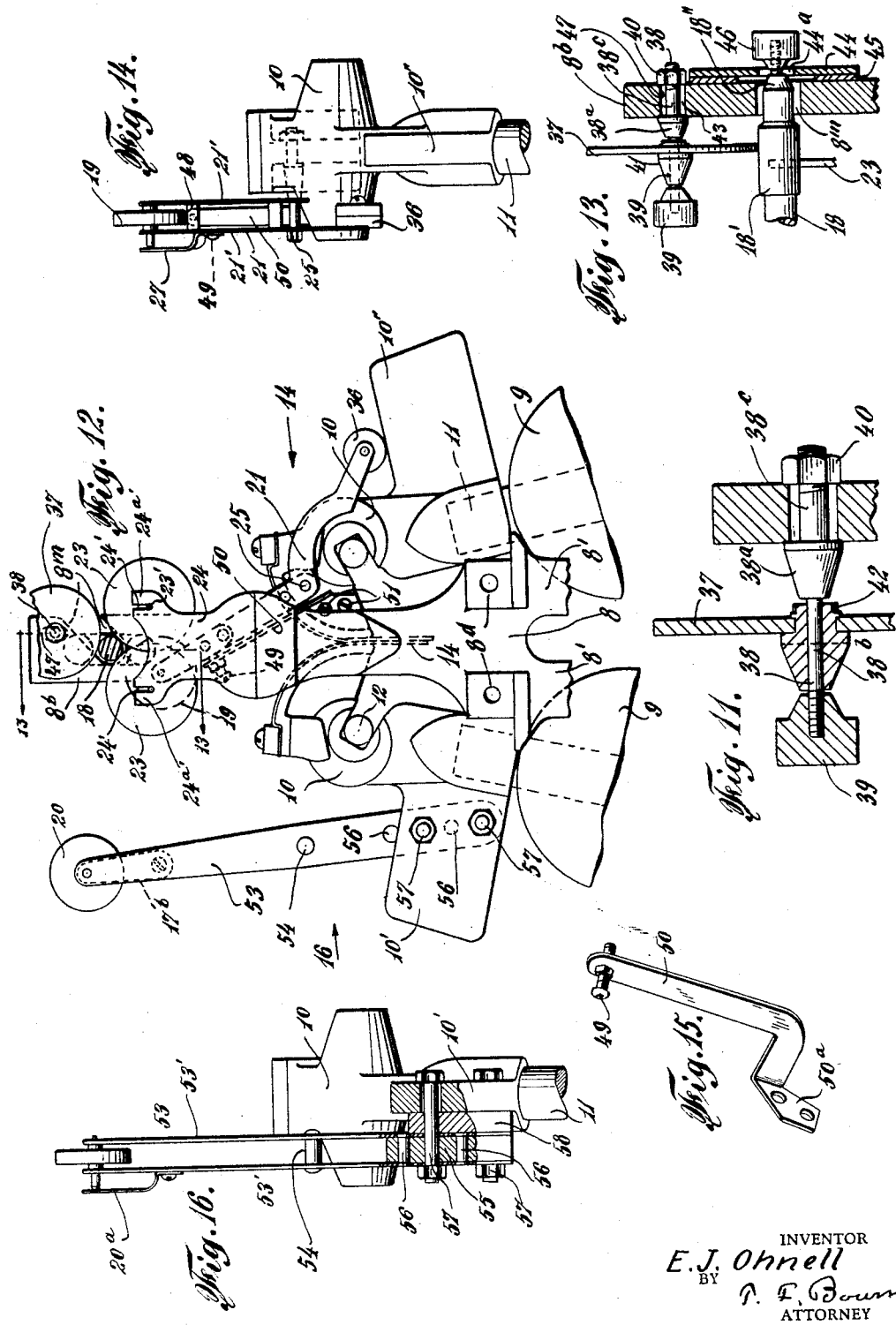

Patented Mar. 24, 1931

1,797,441

UNITED STATES PATENT OFFICE

ERNST J. OHNELL, OF NEW YORK, N. Y.

MEASURING INSTRUMENT

Application filed June 24, 1927. Serial No. 201,078.

My invention relates to improvements in measuring instruments, and more particularly aims to provide improvements capable of use in such instruments commonly called automatic weighing scales, wherein a pointer or indicator and a calibrated dial, cylinder or the like, are given relative movement, for weight indicating or recording purposes, as the direct result of a weight application to a scale pan, platform or the like.

One of the objects of the invention is to provide a transmitting mechanism from the draft-rod or equivalent, to the movable weight indicating or registering element, in which mechanism toothed gearing is eliminated and exceedingly delicate and accurate weight indications or registrations will be attained.

Another object is to provide a transmitting mechanism of the kind referred to, wherein the desired movement of the movable indicating element is attained by cam-means.

Another object is to provide such a cam means, wherein the cam structure or structures will be secured directly to an indicator shaft or equivalent, and there will be a cam actuating device or devices operated from the load or force to be measured.

Other objects are to provide improved mountings for a cam axis and for a cam actuating device.

Another object is to provide a mounting for a cam actuating device such that the latter may be yieldingly urged against a cam surface by means nicely adjustable and conveniently accessible for such adjustment.

My invention comprises novel details and other improvements in the nature of novel combinations of parts, as will be more fully hereinafter set forth and then pointed out in the appended claims.

In the accompanying drawings:

Fig. 1 is a front elevation, partially broken away, of the head of a weighing scale incorporating a form or embodiment of my invention involving cam means including a plurality of cam structures on the indicator or pointer shaft;

Fig. 2 is a vertical section, taken substantially on line 2, 2, in Fig. 1;

Fig. 3 is an enlarged detail, partially broken away and partially in section, showing certain of the parts of Fig. 2;

Fig. 4 is a detail view illustrating both cam structures and their coacting parts as in Fig. 1, for a "zero" reading of the pointer;

Fig. 5 is a detached view showing the cam structures and the parts coacting particularly with one of the cam structures, redisposed from the positions shown in Fig. 1 as the result of a rotation of both cam structures through 180° in a clockwise direction;

Fig. 6 is a view similar to Fig. 5, except that the last mentioned cam structure and said coacting parts are omitted, and, instead, the coacting parts for the other cam structure are shown;

Fig. 7 shows certain of the parts of Fig. 6, on a slightly enlarged scale and in side elevation, being a view looking in the direction of the arrow 7 of Fig. 4;

Fig. 8 is an enlarged perspective view of a part shown in Figs. 6 and 7;

Fig. 9 is a view similar to Fig. 7, but looking in the direction of the arrow 9 of Fig. 4;

Fig. 10 is an enlarged fragmentary sectional view on line 10, 10, of Fig 4;

Fig. 11 is an enlarged detail section;

Fig. 12 illustrates certain modifications, particularly relating to the mountings of the followers or actuating rollers for the cam structures;

Fig. 13 is an enlarged fragmentary view, being a section taken on line 13, 13, of Fig. 12;

Fig. 14 is a view similar to Fig. 7, but looking in the direction of the arrow 14 of Fig. 12;

Fig. 15 is a somewhat enlarged perspective view, of a part shown in Figs. 12 and 14;

Fig. 16 is a view also similar to Fig. 7, but a view, partially broken away and partially in section, looking in the direction of the arrow 16 of Fig 12;

Fig. 17 is a view similar to Fig. 6, but illustrating a form or embodiment of the invention involving cam means including a single cam structure on the indicator or pointer-shaft, and certain other modifications;

Fig. 18 is an enlarged fragmentary view, being a section taken on line 18, 18, of Fig. 17;

Fig. 19 is an enlarged section on line 19, 19, in Fig. 17;

Fig. 20 is a detail side view, and

Fig. 21 is a perspective exploded view of a cam actuator.

Similar reference characters refer to similar parts throughout the several views of the drawings.

Referring preliminarily to Figs. 1 and 2, the numeral 1 designates a suitable casing or head frame adapted to contain the weighing mechanism hereinafter described, which casing is shown provided with weight registering means including a suitable calibrated element and an indicator or pointer, one of which is moved relatively to the other during functioning of the weighing mechanism as is well known in the art.

In the present case, the calibrated element or dial indicated at 2 is the fixed element of the weight indicating or registering means, and the pointer indicated at 3 is the element moved by the weighing mechanism.

The casing 1 is supported upon a standard or upright 4, shown rising as a hollow column from a base (not shown), which base may mount a movable platform or the like operatively connected to a draft-rod 5 in a manner familiar in the art. Said draft rod may have associated with it, by means of a suitable hanger 6, a dash-pot 7, as and for purposes also well known in the art. Within the head frame 1 is a suitable framing 8 including front posts 8', (Fig. 1), and posts such as those shown in Fig. 2 at 8''. The upper end portion 5' of draft-rod 5, is adapted, during measuring or weighing, to move up and down in the space between the posts of framing 8, to cause the swinging out and away from each other of a pair of arms or fulcrum blocks 10 shown connected by rods 11 with weights 9, or to allow such arms to drop back to the positions illustrated. These arms 10 are shown having anti-friction mountings by means of pivots or gudgeons 12 resting on the rounded upper ends of inclined supports 13 journaled on superstructure-members 8a on framing 8, following a construction previously known in the art. The upper portion of each arm 10 is curved, and flexible bands or strips 14 are provided, attached at their upper ends as indicated at 14' to the curved portions of the arms, and joined at their lower ends and there provided with a link 15 for engaging the hook 5' at the upper end of the draft rod; a general arrangement of parts also previously known in the art. The foregoing parts illustrate a means for rotating the arms 10, although other desired means may be used for the purpose.

In order to effect a measuring relative movement between an indicator and a line of calibrations, (in the present case to move the pointer 3 relative to the dial 2), and in order, at the same time, to do this by interposing between the weight-carrying mechanism or an equivalent, and the pointer 3 or an equivalent, a transmitting mechanism functioning according to the invention, the forms of weighing scales illustrated incorporate a pivotal mounting for the pointer, a cam-means including a cam instrumentality on the pointer shaft, and one or more cam actuators or followers moved with the weighted arms.

In the form of the invention illustrated in Figs. 1 and 2, such cam instrumentality includes two cams 16 and 17, secured on shaft 18 which carries the pointer 3; and two cam actuators are provided, one for each cam. One of these actuators preferably includes a roller 20 for acting on the cam 17 to move the pointer 3 away from a zero reading on the dial, (Fig. 5), and the other actuator preferably includes a roller 19 for acting on the cam 16 to move the pointer 3 back to the zero reading, (Fig. 6). Roller 19 is journaled on the upper end of a member 21 of an actuator carried by the arm or fulcrum block 10 to the right in Fig. 1, and roller 20 is journaled on the upper end of a member 22 of the other actuator carried by the other arm or fulcrum block 10.

Referring to Figs. 4 and 5, which views, respectively, show the pointer 3 at a zero reading on the dial, and at a point on the dial 180° from the zero mark after a clockwise movement of the pointer as indicated by the arrow W of Fig. 5, it will be understood that the pressure exerted against cam 17 by roller 20 during an upward swinging of the weighted arms, (caused by a weight applied on the scale platform), will continue against said cam 17 and will always be applied thereto at a point to impart the required turning moment to the cam and hence to the pointer, for weight measuring. In other words, when the arm 10 to the left of Fig. 4 has been raised to the height shown in Fig. 5, the roller 20 will have been swung in toward the shaft 18 along a line relative to said shaft and will thereby have rotated the cam 17 in a clockwise direction to dispose the cams as shown in Fig. 5, and will thus have rotated the shaft 18 through 180° and swung the pointer 3 from the full line position of Fig. 4 to the full line position of Fig. 5. During the operation last described (and see now Fig. 6 also), the roller 19, on the weighted arm to the right in Fig. 4, will have been permitted to swing to the left, (Fig. 6), during this swinging movement holding idler contact with cam 16. Thus, when the roller 20 has been redisposed from the position shown in Fig. 4 to that shown in Fig. 5, the roller 19 has been redisposed from the position shown in Fig. 4 to that shown in Fig. 6; the cam 16 now lying as shown in Figs. 5 and 6. On releasing the down-pull on the draft-rod and on the strips 14, (when the weight is removed from the platform) the arms 10 will approach and the roller 19 will act positively against the cam 16 and thereby cause such cam to rotate in an anti-clockwise direction from the position shown in Fig. 6 to the position shown in Fig. 4, thereby at the same time to rotate the shaft 18 in the same direction and so move the pointer 3 back to the zero reading in the direction indicated by the arrow C of Fig. 5, and the roller 20 will idly contact the cam 17 as said cam turns also in the direction of the arrow C. During any downward swinging of the weighted arms required to restore the weights 9 and the other parts just mentioned to their normal positions as shown in Fig. 4, that is, to return the pointer 3 to "zero" from any weight reading, it will be noted that in this case also the pressure exerted by the actuating roller (the roller 19) against its cam 16 will always be exerted along a line relative to the center of rotation of the cam acted on by the actuating roller.

As shown in Figs. 1 and 3, the shaft 18 is provided with anti-friction journaling means including enlarged portions 18' of the shaft resting on adjacent disc-pairs 23 journaled at their centers in bearings carried by brackets 24 secured to standards 8b extending upwardly from the superstructure members 8a, (Fig. 2), of framing 8.

Referring to Figs. 1 and 4, the members or carriers 21 and 22 for the cam rollers 19 and 20 are not rigidly secured on the arms or fulcrum blocks 10 but are rockably mounted thereon at 25 and 26, and are yieldably urged toward a certain disposition on their pivots. The purpose of this arrangement is to avoid chattering and shock between a cam actuator and its cam, on a sudden weight thrust on the scale platform or pan or on a sudden weight release. The member 21, (Fig. 4), includes a skeleton arm, as shown in Fig. 7, pivoted at 25 on the corresponding arm 10 therebelow and made up in the main of a pair of thin side-bars 21' and a bridge-piece 21", such arm carrying at one side a familiar form of leaf-spring pivot-retainer 27 for the roller 19 journaled at the upper end of the arm. On the same pivot 25 is a rock-lever 28, as best illustrated in Fig. 8, having pierced depending tabs 28' receiving said pivot 25. This rock lever also carries, opposite the bridge-piece 21" of the skeleton arm 21, an adjusting screw 29, to limit approach of arm 27 toward the upper arm of rock lever or arm 28. One of the side stiffening webs of the rock lever 28 carries a projection 30 having a thickened portion 31 in which is mounted an adjusting screw 32. The lower end of screw 32 overlies a boss, shown at 32a in Fig. 6, on the arm 10, thereby to provide a stop means to coact with the stop means provided by screw 29, thus to limit the amplitude of swing of arm 21 relative to rock lever 28. Beyond the location of the screw 32, the projection 30 of the rock lever is inwardly slightly bent, and near its free end the projection has a hole in which is fastened the upper end of a retractile spring 35, the lower end of which is secured to an adjusting screw 33 in a boss 34 on the fulcrum block 10 therebelow, (Figs. 4 and 6). Skeleton arm 21 is in the nature of a rock lever, the lower half or arm of which carries balance weight 36. Thus, an arrangement is provided according to which the weight 36 secured to the main rock-lever or arm 21 carrying the roller 19, causes the latter to bear resiliently against cam 16, and the spring-acting arm 28 serves to resist shocks and thrusts that may be transmitted from the draft-rod 5. For a similar purpose the member 22 includes a skeleton arm carrying the roller 20, as shown most clearly in Figs. 9 and 10. Side-bars 22' are employed, and also a leaf-spring pivot-retainer 20a for the roller 20 similar to the retainer 27 of Fig. 7. The pivot 26, for the substantially straight lever of which this arm forms the upper portion, is mounted on a web-extension 10' of the corresponding arm or fulcrum block 10 below the roller 20, (Fig. 4), the side bars 22' being rigidified by an interposed pivot-journaling piece 37 riveted in place as indicated at 38 in Fig. 10, and, at the lower end of the straight lever, by an interposed sleeve 39 taking about a rivet 40 joining the side bars. The sleeve 39 is shown of rectangular outline at its outer periphery, and one of the flats of the square is arranged to face and act as a stop relative to the end of a screw 41 adjustable in a boss 42 offset from the web-extension 10', (Figs. 4 and 9). Another boss 43, just above the boss 42, mounts an adjusting screw 44 to which is connected one end of a retractile spring 45, the other end of which is attached to lever 22 as indicated at 22a, Fig. 4. Thus, as in the case of the roller 19, there is provided an arrangement according to which a stop device, the screw 41, coacts with a device for yieldingly urging the roller 20 against its cam 17, which latter device is the spring 45, in providing a shock-absorbing means between the roller 20, the cam 17 and the draft-rod 5, for resiliently resisting thrusts that may be transmitted from the scale platform or pan.

Referring to Figs. 1, 2, 3 and 11, there are provided discs 37 journaled at their centers over the pointer shaft 18 and close thereto providing anti-friction retaining means for holding the shaft against upleap with the discs 37 on sudden shock. As will be seen from Fig. 1, each of the four discs 23 has the pivot ends 23' of its shaft or hub 23" merely resting by gravity in slots 24' in upstanding forks on brackets 24, (Figs. 3 and 12).

Each disc 37 is rotatively mounted on a fitment illustrated in detail in Fig. 11, there being one such fitment on each of the two superstructure members 8b of Fig. 3. Each said complete fitment includes a rod 38 having a central enlargement 38a and also end-threaded cylindrical portions 38b and 38c, and nuts 39 and 40. A conical spacer indicated at 41, Figs. 3 and 11, is secured to each disc 37 and journaled upon shaft portion 38b. Spacer 41 is shown provided with a hub 42 entering a hole in disc 37 and swaged thereto with the disc against the spacer, Fig. 11. Each of the super-structure members 8b is provided with a slot or hole indicated at 43 in Fig. 13, for adjustably receiving the cylindrical portion 38c of rod 38.

As also shown in Figs. 3, 12 and 13, shaft 18 near its ends is loosely located in inclined recesses or slots 8m in the members 8b to rest on the corresponding discs 23, (Fig. 12). The discs 37 with their spacers 41 are mounted and adjusted for free rotation on the rods 38 between the enlargements 38a and the nuts 39, and the portions 38c of the rods are passed through the corresponding slots 43. The discs 37 are then adjusted in close but free relation to the underlying portions 18' of the pointer shaft 18, (as by inserting thin shims between the discs and the portions 18'), and then the nuts 40 are fitted tight against the members 8b to retain the discs 37 pivotally opposed to the pointer shaft and the shims are withdrawn. The pointer shaft will rotate freely upon the discs 23 and upward thrust of the shaft will be opposed in an antifriction manner by the discs 37. The rear portion of the shaft 18, (the right hand side in Figs. 3 and 13), is provided with a reduced conical portion 18", and beyond this portion 18" is a small cylindrical portion threaded at and near its free end and extending beyond slot 8m and through an aperture 44a in a plate 44 secured on pads 45 carried by the superstructure member 8b at the right, (Figs. 3 and 13). A nut 46 is applied to the threaded free end part of the shaft portion 18a. Said nut has a rounded projection as shown, so that when the nut is properly adjusted the rounded projection thereof and the conical portion 18" of the pointer-shaft will be loosely on opposite sides of the plate 44, these parts coacting to freely restrain the pointer-shaft against endwise shift.

Fig. 12 illustrates a modification of the form of the means for mounting the cam followers or actuating rollers 19 and 20. Referring to Figs. 12, 14 and 15, the roller 19 is carried by the rock-lever 21, the side bars 21' of which lever are joined just below the roller 19 by a cross-piece 48, Fig. 14. This cross-piece is so located as to face an end of an adjusting screw 49, carried at the upper or free end of a bent leaf-spring 50, the shape of which is shown in Fig. 15. The main or working length of spring 50 extends along the upper arm of the lever 21, the portion 50a of the leaf-spring being laid flat against the right hand underlying arm or fulcrum block 10 and screwed thereto as indicated at 51 in Fig. 12. Since the weight 36 serves to press the roller 19 against the cam 16 the leaf-spring 50 resiliently opposes lever 21 to resist shocks from sudden application of weight upon the scale platform or pan, and release of weight. As shown in Figs. 12 and 14, the arm 10 at the right may carry a web-extension 10" to act as a balance weight in regard to the web-extension 10' of the other arm.

Referring to Figs. 12 and 16, it will be seen that the cam follower or actuating roller 20 is revoluble on a support which is rigid on the extension 10' of the underlying arm 10. This roller is at the top of an arm 53, which, although not pivoted as is the lever 22 of Fig. 1, is of skeleton construction like said lever and has other features in common therewith. Thus, the arm 53 includes spaced side-bars 53', like the side-bars 22' of Fig. 6, and these bars 53' are joined by a tying rivet and a spacer-sleeve on the rivet as indicated at 54; while there is a leaf-spring pivot-retainer 20a for roller 20 at the top of the arm 53 corresponding to the part 20a of Fig. 9. The arm 53 at its bottom carries between its side-bars a spacer-block 55 riveted in place at 56, and at the location of this block the arm 53 is bolted to the web-extension 10' by bolts 57, these bolts also passing through an auxiliary block 58 of a thickness properly to locate the roller 20.

Referring to the embodiment of the invention illustrated in Fig. 17, and one involving a cam means on the pointer-shaft 18 including a single cam structure 59 fixed on the shaft, it will be noted that this cam 59 is provided with a cam-groove 60, the parallel or longitudinal edge portions 60a and 60b of which are the active cam surfaces, corresponding in function, and in the present case in shape, to the peripheral edges of the two cams 16 and 17 acted on by the rollers 19 and 20 of Fig. 1. The bracket 24 carries an extension 63 mounting a screw 64 overlying the shaft 18 and adjustable to take the place of the overlying disc 37 of Figs. 1 and 3 in preventing upleap of the shaft and the disc pairs 23, on sudden shock.

The cam structure of Fig. 17 may be operated by a follower or actuating roller set with some slight clearance in the cam-groove 60, and yieldingly urged in opposite directions for shock-absorption purposes on weight application as well as on weight release. The roller 65 is active against the cam surface 60b to move the indicator or pointer 3 which is secured to the shaft 18 away from the "zero" reading on down-pull of the draft-rod 5, and on accompanying up-swing of the arms 10, and against the cam surface 60a, to move said indicator back to the zero reading, on releasing the down-pull on the draft-rod. The roller 65 is of such a diameter as to have a very slight clearance in the cam-grove 60 along its entire working length, as here intended to be shown in the drawing, and consequently I prefer to employ means, as the retractile coil springs 67 and 68, as illustrated most clearly in Figs. 18 and 19, for yieldingly urging said roller in the proper direction towards its appointed cam surface. The arrangement is such that the spring 67 always urges the roller 65 to the right against cam surface 60b, and the spring 68 always urges said roller to the left against cam surface 60a, by means of a pivotal arrangement of the arm supporting the roller 65. As shown in Fig. 19, a pair of spaced bars or plates 72 and 73 mount at the top and between them the roller 65, which bars or plates 72 and 73 are spaced by an interposed block 74 at their bottoms, these three parts being secured together by rivets 74'. The structure comprising the parts 72, 73 and 74 is pivotally mounted as a swing-arm on a pair of outside plates 75 and 76, by bolt 75a passing through holes B in the parts 72, 73 and 74, (Fig. 19). A pair of auxiliary plates 78 and 79 are interposed between the outside plates 75 and 76. Rivets (indicated at 80 in Fig. 17) pass through the holes 80' in the lower or T-heads of the plates 78 and 79, thus locking these plates together to constitute a secondary swing-arm. Rivets 81, 82, (Fig. 19), are passed through the adjacent arm 10 and through the holes in the plates 75 and 76 to secure them to arm 10. Spring 67 is stretched between an ear 73a at the upper end of plate 73, and a screw 84 on an ear 78a at the upper end of plate 78, the tension of which spring may be adjusted by said screw. Spring 68 is stretched between an ear 79a at the upper end of plate 79, and a screw 83 on an ear 76a at the upper end of plate 76, (Fig. 18), so that the tension of this spring may be adjusted by said screw. Thus, a main swing-arm directly supports the roller 65, (this swing-arm comprising the elements 72, 73 and 74), and an auxiliary swing-arm comprising the elements 78 and 79 cooperates with it, relatively to the fixed members 76 and 75. Spring 67 exerts a pull in one direction and spring 68 exerts a pull in the opposite direction. Obviously, such an arrangement is most convenient for readily adjusting and nicely correlating the action of the springs 67 and 68, so that the roller 65 is resiliently supported and balanced between the cam surfaces 60a and 60b to flex in either direction.

A roller 66 is operative in the cam groove 60 and is pivotally carried by an arm 69 that is pivotally connected at 71 with the bars or plates 72, 73, as illustrated in Fig. 17. The arm 69 is provided with a weight at 70 normally tending to tilt the arm in such a manner that the roller 66 will bear against the cam surface 60a of cam groove 60. The effect of the weighted arm 69 is to help steady the shaft 18 and the cam, so as to keep the cam surface 60b in contact with roller 65.

By means of my improvements the indicator or pointer shaft 18 will be operated in an exceedingly accurate manner by reason of the pressure exerted against the cam surface for direct rotation of the indicator or pointer shaft without lost motion, with a minimum of friction, and with high degree of sensitiveness, yet with relatively rugged mechanism. The speed ratio of shaft 18 is constant, because a certain continuously variable angular velocity of an arm 10 directly produces a constant angular velocity of the shaft 18, whereby accuracy of weighing indication or registering is attained. The indicator shaft 18 may be rotative 360°, or for any desired extent of rotation more or less than 360° according to the length of the cam surfaces used in conjunction with the cam actuators. Reliability of operation for a comparatively long period without danger of injury to the cam and its actuator may be depended upon, an advantage being that toothed gearing for rotating the shaft 18 is obviated and the well known disadvantages of such gearing overcome.

My improvements are simple and relatively cheap to manufacture, are not liable to get out of order and the parts may be readily adjusted and replaced when required.

It will be understood that while I have illustrated and described a practical and efficient embodiment of my invention, and certain modifications thereof, the invention is not limited to the particular details of construction and relative arrangement of parts set forth, as these may be varied, within the scope of the appended claims, without departing from the spirit of the invention.

Having now described my invention what I claim is:—

1. A measuring instrument comprising a movable part to be moved to an extent corresponding to the magnitude of the measurement being taken, a part to be moved by the first mentioned part to indicate such measurement, and transmitting means between said parts including a cam-means extending around the axis of the part to be moved and a cam actuator operative by the first named part to rotate said cam-means to indicate weight.

2. A measuring instrument comprising a movable part to be moved to an extent corresponding to the magnitude of the measurement being taken, a part to be moved by the first mentioned part to indicate such measurement, and transmitting means between said parts including a cam-means extending around the axis of the part to be moved and a cam moving roller operated by said first mentioned part to rotate the cam-means to indicate weight.

3. A measuring instrument comprising a movable part to be moved to an extent corresponding to the magnitude of the measurement being taken, a part to be moved by the first mentioned part to indicate such measurement, and transmitting means between said parts including a cam-means extending around the axis of the part to be moved, said measurement indicating part and said cam-means being rotatable about a common axis.

4. A measuring instrument comprising a movable part to be moved to an extent corresponding to the magnitude of the measurement being taken, a part to be moved by the first mentioned part to indicate such measurement, a transmitting means between said parts including a cam structure rigid with said measurement indicating part and extending around the axis of the part to be moved, a cam actuator operated by the first-mentioned movable part, and means for causing resilient cooperation of said actuator with said cam structure for rotating the latter to indicate weight.

5. An automatic weighing scale comprising a pivoted structure to be rocked on its pivot different amounts by different weight applications, a rotatably mounted weight indicating element, and an operative connection between said pivoted structure and said indicating element, said operative connection including a cam-means extending around the axis of said element and a cam rotating device, said device actuated by rocking of said pivoted structure.

6. An automatic weighing scale comprising a pivoted structure to be rocked on its pivot different amounts by different weight applications, a rotatably mounted weight indicating element, and a motion transmitting means from said structure to said element including a cam fixed to said element and extending around the axis thereof and a roller moved relative to the cam axis, thereby to rotate the cam, by rocking of said structure to indicate weight.

7. An automatic weighing scale comprising a movable member to be moved different amounts by different weight applications, a rotatably mounted weight indicating element, a cam-means rigid with said element and extending around the axis thereof, and a device for actuating said cam-means by a movement of said member to indicate weight.

8. An automatic weighing scale comprising a movable member to be moved different amounts by different weight applications, a rotatably mounted weight indicating element, a cam-means mounted for rotation with said element about the axis of the latter, said cam-means extending around the axis of said element, and actuating means for the cam-means, said actuating means being operable by the movement of said movable member on weight release as well as on weight application for correspondingly operating the cam-means.

9. An automatic weighing scale comprising a movable member moved different amounts on different weight applications, a movable weight indicating element, and an operative connection between said member and element, said connection including a cam-means extending around the axis of said element and a cam actuator, said actuator being rockably mounted on said movable member.

10. An automatic weighing scale comprising a movable member to be moved different amounts by different weight applications, a movable weight indicating element, and an operative connection between said member and element, said connection including a cam-means extending around the axis of said element and a cam actuator, said actuator being resiliently supported on said movable member.

11. An automatic weighing scale comprising a movable member to be moved different amounts by different weight applications, a movable weight indicating element, and an operative connection between said member and element, said connection including a cam-means extending around the axis of said element and a cam actuator, said actuator being movably mounted on said movable member, and means for yieldingly urging said actuator respecting the cam-means.

12. A weighing scale comprising movable members moved different amounts by different weight applications, a movable weight indicating element, operative connections between said members and element including cam-means having a plurality of cam surfaces, a plurality of cam actuators, and means mounting said actuators for movement with said movable members to cause one actuator to act on one of said surfaces to move said element in one direction for weight measuring and for movement with said movable members to cause the other actuator to act on the other of said surfaces to move said element reversely.

13. A weighing scale comprising a rotatable weight indicating element, cam-means including a plurality of cam structures both rigid with said element, and weighing devices having actuating means for each of said cam structures for rotating the latter in opposite directions.

14. A weighing scale comprising a rotatable weight indicating element, cam-means including a cam structure rigid with said element and having a plurality of cam surfaces, a plurality of cam actuating rollers each for coaction with a different one of said surfaces, and means operated by weight application for bringing into action one of said rollers for rotating the cam structure in one direction and operated by weight release for bringing into action the other of said rollers for rotating the cam structure in a reverse direction.

15. A weighing scale comprising weighing devices including rotative arms operative together, a rotative indicator shaft, cam-means rigidly secured to said shaft to rotate it including a plurality of cam surfaces, and cam actuators carried by said arms and respectively cooperative with said cam surfaces, one of said actuators operating on one cam surface to rotate said shaft to indicate weight when said arms move outwardly and the other actuator operating on the other cam surface to rotate the shaft reversely when the arms move inwardly.

16. A weighing scale as set forth in claim 15, in which the cam actuators include means for causing resilient cooperation thereof with the cam surfaces.

17. A measuring instrument comprising a movable part to be moved by a weight at a continuously variable angular velocity, a part to be moved by the first named part, and operative means between said parts for operating the second named part at a constant angular velocity including cam-means secured to the second named part and extending around the axis thereof, and a cam actuator operative by the first named part to rotate the cam-means to indicate weight.

18. A weighing scale comprising an indicator shaft, and journaling means for the shaft including underlying pivoted discs and an overlying roller to resist up-thrust of said shaft.

19. A weighing scale as set forth in claim 18, provided with means for retaining said roller at a pre-determined height above the shaft.

ERNST J. OHNELL.